Nov. 3, 1964   W. W. EGEE ETAL   3,154,805
APPARATUS FOR DEBONING COOKED POULTRY
Filed Nov. 17, 1961   3 Sheets-Sheet 1
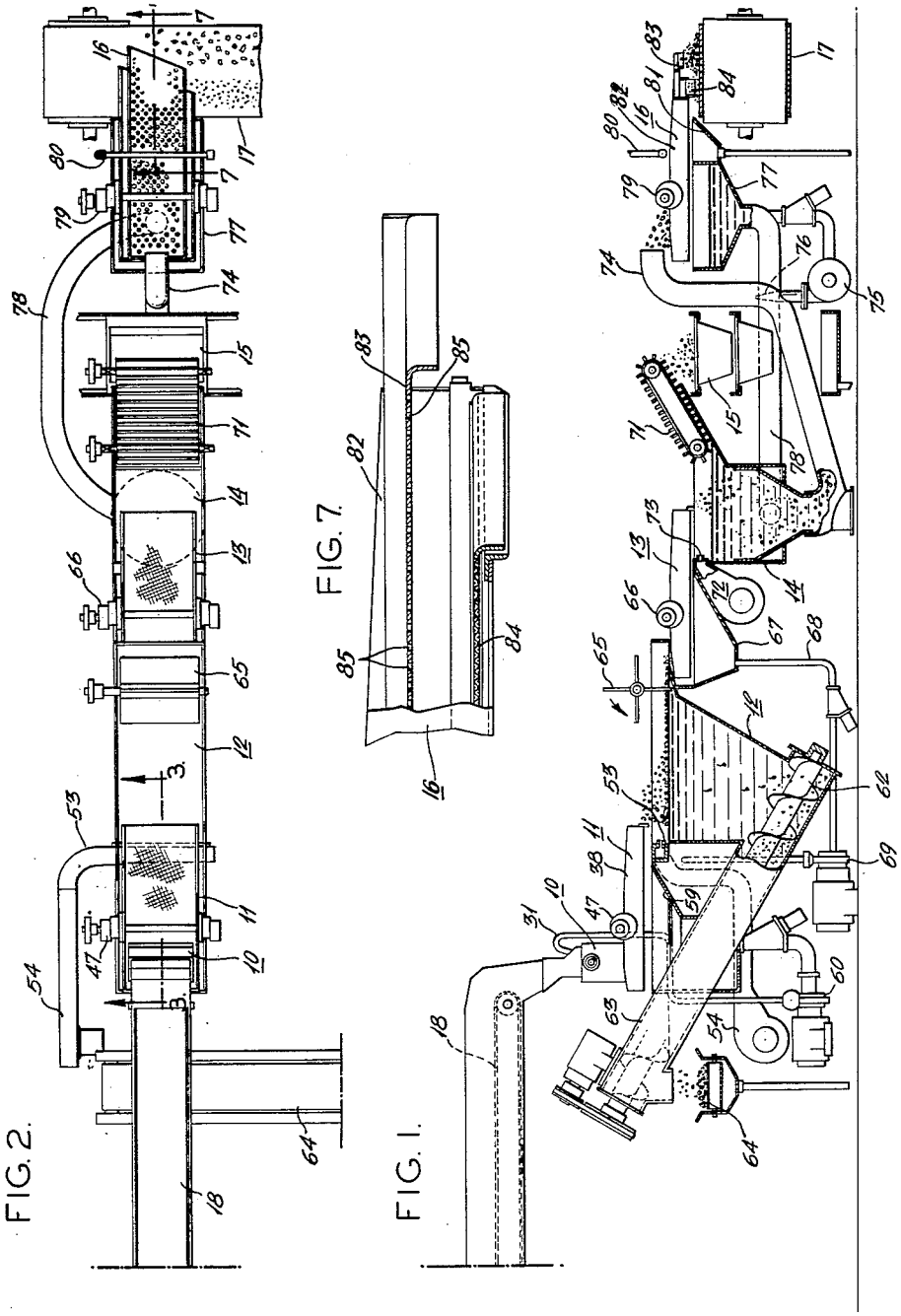
INVENTORS:
WALTER WARREN EGEE
EDWARD R. THOMAS
BY *Howson & Howson*
ATTYS.

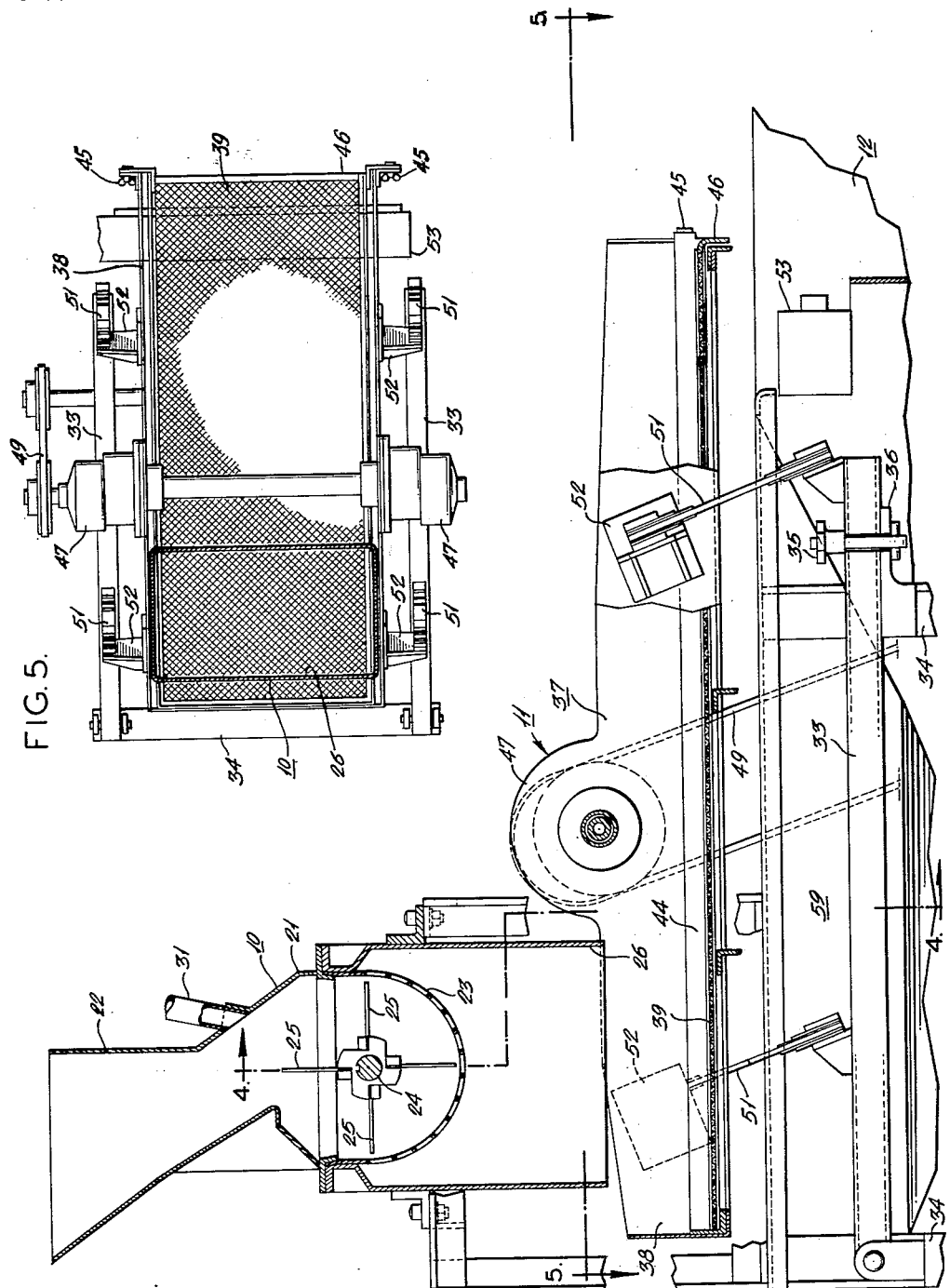

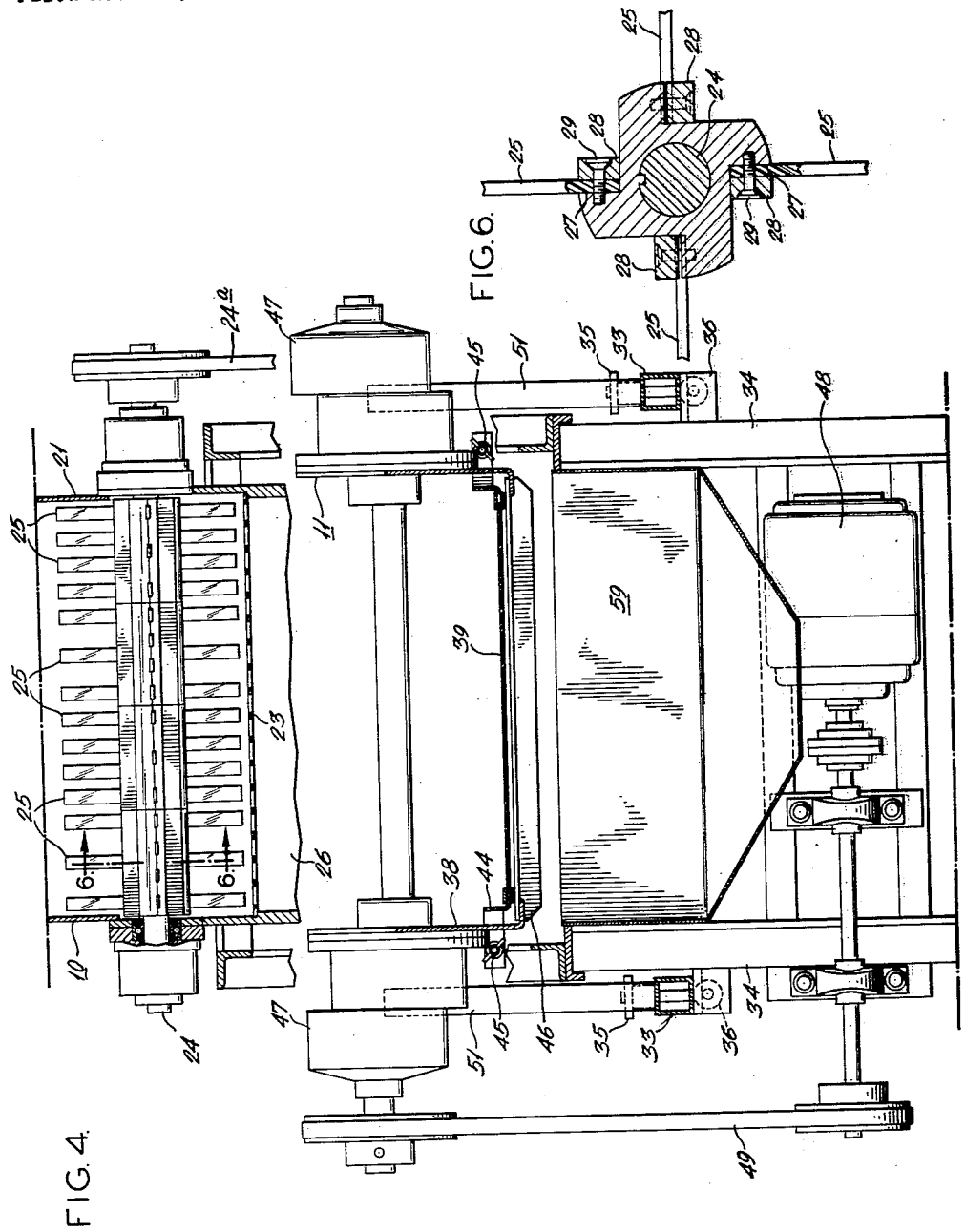

United States Patent Office 3,154,805
Patented Nov. 3, 1964

3,154,805
APPARATUS FOR DEBONING COOKED POULTRY
Walter Warren Egee, Wallingford, Pa., and Edward R. Thomas, Haddonfield, N.J., assignors to Campbell Soup Company, Camden, N.J., a corporation of New Jersey
Filed Nov. 17, 1961, Ser. No. 153,111
8 Claims. (Cl. 17—1)

The present invention relates to new and useful improvements in apparatus for separating the bone, meat and skin of previously cooked poultry in preparation for other processing of the meat for ultimate consumption.

This application is a continuation-in-part of our copending application Serial Number 746,275, filed July 2, 1958, now abandoned.

A primary object of the present invention is to provide a practical commercially acceptable apparatus for separating the meat of cooked poultry and the like from the bones and skin.

Another object of the present invention is to provide apparatus of this type which will segregate the edible meat of poultry and the like from the skin and bone, taking the meat away from the bone in relatively large pieces and not breaking the bones.

In the canning industry, and in food processing generally, there is rigid governmental control over quality. In the processing of chicken and other fowl, a primary requirement is that the finished product be free of residual bone. Prior to this invention, the processing of fowl to eliminate the bone and other undesirable elements has been essentially manual in character requiring the services of skilled operators and minute sorting and inspection resulting in higher production costs and also in a substantial loss of useful meat. Prior to this invention there has been no practical and commercially acceptable mechanical substitute for this manual process, by reason in part, of the inability of the devices previously proposed to cleanly and completely separate the meat without at the same time breaking the bones to such a degree that it is practically impossible to subsequently segregate the meat from the smaller bone fragments, even with extended manual sorting. The present invention provides apparatus which is capable of separating and segregating substantially all of the bone from the meat of the fowl and also for segregating the usable meat from the other undesired components of the fowl.

Various other objects of the present invention and the features and details of the operation and construction thereof are hereinafter more fully set forth and described in conjunction with one embodiment of the present invention illustrated in the accompanying drawings in which:

FIG. 1 is a schematic longitudinal sectional view through apparatus made in accordance with the present invention;

FIG. 2 is a plan view of the apparatus illustrated in FIG. 1;

FIG. 3 is an enlarged fragmentary longitudinal sectional view taken on line 3—3, FIG. 2 illustrating the hammer mill and screen construction for separating the meat from the bone;

FIG. 4 is an enlarged fragmentary transverse sectional view taken on line 4—4, FIG. 3;

FIG. 5 is a sectional plan view of reduced scale taken on line 5—5, FIG. 3;

FIG. 6 is an enlarged fragmentary transverse sectional view taken on line 6—6, FIG. 4 illustrating one means for securing the hammer elements to the rotor of the hammer mill; and FIG. 7 is an enlarged fragmentary sectional view taken on line 7—7, FIG. 2.

Referring more specifically to the drawings, the apparatus of the present invention comprises generally a hammer mill 10 in which the precooked fowl is initially placed. The hammer mill separates the bones, meat and skin of the fowl and deposits the separated products on a shaker 11, which disperses the products over the surface of a liquid in a first separating tank 12. In this embodiment of the present invention the bone sinks by gravity to the bottom of the separating tank 12 while the meat and skin float on the top and are removed therefrom and deposited on a second shaker 13 which disperses the meat and skin over the surface of a liquid in a second separating tank 14. In the second separating tank the meat sinks and is separated from the skin of the fowl and removed separately from the tank 14 with the skin being deposited, for example, in containers 15 and the meat being deposited on a third shaker 16 which in turn disperses the meat over the surface of a discharge conveyor 17.

In accordance with the present invention the precooked fowl or pieces of fowl are fed to the hammer mill at a predetermined uniform rate, for example, by means of a feed conveyor 18. The hammer mill 10 separates the bone, meat and skin of the fowl by administering a series of impact blows to the fowl preferably through the medium of inherently yieldable, resilient, frictional, impact elements which exert impact blows on the pieces of fowl together with frictionally engaging and simultaneously rubbing along or over the pieces of fowl. The fowl is acted on by the impact elements continuously until the meat, skin and bones have been completely separated without breaking or chipping the bones from which the meat has been removed. It has been found that the deboning operation of the hammer mill is materially improved and facilitated by circulating water through the mill in quantity. After the fowl has been acted on sufficiently to completely separate the bones, meat, and skin, the fowl is discharged through the bottom of the hammer mill for further processing, as set forth, wherein the bones, meat and skin are collected separately.

As illustrated in the drawings, the hammer mill 10 comprises a casing 21 having a feed chute 22 at the top and an open arcuate screen 23 at the bottom. The casing 21 contains a transverse shaft 24 which carries a plurality of radially extending impact elements 25. This rotor, consisting of the shaft 24 adapted for rotation by means of a transmission belt 24a driven by a suitable drive means such as a motor (not shown) and impact elements 25, operates in a generally cylindrical chamber defined in part by the arcuate screen 23 at the bottom, which embraces the rotor at the sides and bottom of the hammer mill and through which the material in the mill must pass to be discharged through the open bottom 26 of the casing 21.

An important feature of the present invention resides in the construction of the impact elements 25. These impact elements 25 are composed of material which will yield under impact so that the impact forces exerted on the pieces of fowl is cushioned to an extent precluding fracture or splintering of the bone. The surface of the impact elements also should have good frictional qualities so that a frictional rubbing force is exerted on the surface of the pieces of fowl during rotation of the rotor to rub the skin away from the meat and the meat away from the bone. Flexibility is a desirable but not essential property of the impact elements and while many materials will meet the requirements, it has been found that fabric reinforced rubberized material of the character used in rubber belting is highly suitable for use in the impact elements. Also it has been found that molded nylon is particularly suitable for use in forming the impact elements 25.

In the present instance the impact elements 25 are in the form of blades arranged on the shaft in four axial series, separated at angles of 90°, with each series containing a plurality of blades spaced substantially uniformly along the axis of the shaft 24. The individual blades are secured to the shaft 24 with the butt ends of the blades of each series positioned against a flat shoulder 27 carried by the shaft 24 and held in place against the shoulder by means of retaining strips 28 which extend axially of the shaft 24 in spaced parallel relation to the shoulder 27 and are held in pressure applying relation against the butt ends of the blades, for example, by means of bolts 29, thus precluding movement of the blades relative to the shaft 24. The impact elements or blades 25 are carried by the shaft in such position that the flat side of the blade faces in the direction of rotation of the shaft, thus providing a more gentle impact and spreading the impact and frictional engagement of the blade with the piece of fowl over a considerably greater area than in prior apparatus of this type wherein the fowl was engaged by a sharpened end edge of the blade.

As previously set forth, circulation of water through the hammer mill in quantity aids materially in the deboning operation. Such circulation may be effected by flow from a suitable supply pipe 31 which discharges water into the impact chamber, as illustrated in FIG. 3. The flow of water is substantial and may be in the order of 50 to 100 gallons per minute for a chamber as illustrated in FIG. 3.

The hammer mill, as described above, has an application of primary value to fowl, and particularly to chicken, and has been described specifically in that connection. The bones of fowl are relatively brittle and tend to splinter under impact, and the complicated bony structure of fowl is not conducive to clean and rapid deboning by conventional means. The hammer mill, as set forth above, will separate the bone from the flesh cleanly and completely, pulling the meat away from the bone in relatively large pieces without destructive action on the bone. This substantially complete separation of the usable meat from the skin and bones, and the later segregation of the various elements of the fowl effects a material reduction in the cost of processing and affords a material economy in the high yield of usable components as compared with yield under previously required manual procedures and prior apparatus of the general type which destroys and splinters the bone. While this hammer mill has a primary significance in the deboning of fowl, it may be used to advantage in similar operations on other products.

After the meat, skin and bones have been separated from one another by the action of the impact elements or blades 25 of the hammer mill end, they are caused to pass through the openings in the screen or shield 23 and be discharged from the hammer mill onto the first shaker 11. This shaker 11 is constructed as illustrated in FIGS. 3, 4, and 5 of the drawings and transports the separated meat, skin and bones forwardly to a position over the first separating tank 12, dispersing the meat, skin and bones freely over the surface of the liquid in the first separating tank 12. This is a substantial improvement over prior apparatus of this type wherein the meat, skin and bones were dropped in a clump directly into the first separating tank since the separation of the individual pieces of the fowl and wide dispersal over the surface of the liquid in the separating tank considerably increases the effectiveness and the efficiency of the separating tank.

In the illustrated embodiment of the present invention the shaker assembly 11 comprises a pair of spaced parallel stationary supporting arms 33, 33 which may be pivoted at their rear ends to a support frame 34 and removably secured at their forward ends, for example, by means of a removable connector 35 to support brackets 36 carried by the frame 34.

Positioned above the spaced support arms 33, 33 is a shaker tray, designated generally as 37, which comprises and open U-shaped support frame 38 carrying a foraminous plate which in the illustrated embodiment of the present invention is shown as a screen 39. The U-shaped frame 38 comprises a rear plate and a pair of spaced parallel side arms extending forwardly from the rear plate at opposite sides of the hammer mill discharge opening 26 with the screen extending in a generally horizontal plane between the side arms of the frame 38. The screen 39 is fixed to a U-shaped mounting frame 44 which inwardly overlies the lower section of the U-shaped frame 38 and is secured in position, for example, by means of a pair of wing nuts 45, 45. The screen 39 terminates at its forward end in a downwardly turned lip 46 extending substantially perpendicular to the longitudinal axis of the screen. It will be understood that in place of the screen 39 a perforated plate may be provided which may be welded or otherwise secured to the frame.

In accordance with the present invention the meat, bones, and skin discharged from the hammer mill 10 are deposited in the shaker tray and are caused to be advanced to the forward edge of the shaker tray and then dispersed over the surface of the liquid in the first separating tank 12. This breaks up the clumps of material discharged from the hammer mill 10 and increases considerably the effectiveness of the separating tank. The vibrating or back and forth movement of the shaker tray may be accomplished by means of conventional vibrator 47, such as an Ajax-Shaker shaker manufactured by the Ajax Flexible Coupling Company, Westfield, New York. The vibrator 47 is driven continuosly by means of an electric motor 48 which is connected to the vibrator, for example, by means of a belt drive 49.

Movement of the shaker tray 37 is limited to a substantially back and forth path within a substantially horizontal plane by mounting the shaker tray 37 on a series of leaft springs 51. The leaf springs 51 are fixed at their lower ends to the support arm 33, and extend upwardly and rearwardly of the shaker tray with their upper ends being secured to spring retainer plates 52 carried by the frame 38 of the shaker tray. With this construction, during operation of the vibrator 47 the shaker tray is moved back and forth rapidly causing the clumps of bone, meat and skin dropped on the tray by the hammer mill to be broken apart and moved in a forward direction on the tray and discharged thereby into the first separating tank 12. Dispersion of the meat, bones, and skin over the surface of the liquid in the first separating tank 12 is further aided by an air nozzle 53 positioned immediately beneath the lip 46 of the screen 39 which directs a jet of air across the surface of the liquid in the first separating tank. The jet of air serves the additional purpose of directing the floating particles toward the discharge end of the tank as more fully described hereinafter. Air may be supplied to the nozzle 53, for example, by means of a motor driven blower 54.

During movement of the product toward the forward end of the shaker tray the water supplied to the hammer mill 10 through the supply line 31 drains onto and through the screen and is received in a drain tank 59 positioned as illustrated in FIGS. 1 and 3 beneath the discharge end of the hammer mill 10. The drain tank 59 has an outlet therein connected to a drain pipe and if desired, a pump 60 may be positioned in the drain pipe to pump liquid from the drain back through the supply pipe 31 to the hammer mill.

In the first separating tank 12 the bones are separated from the meat and skin with the bones sinking to the bottom of the tank and the meat and skin floating. This is accomplished by providing a brine solution or the like in the first separating tank 12 and controlling the concentration of the brine solution and thus the specific gravity of the brine solution, to cause the meat and skin to float and the bones to sink. It has been found that in processing chicken, a 65% concentration of brine in the first separating tank 12 affords the desired results in separating the bone from the meat and skin., As illustrated in the drawings, the bottom wall of the tank 12 is essentially V-shaped in character, terminating at its lower end in a sump into which the bone settles by gravity. The bone is removed from the sump of the first separating tank 12 by means of a screw conveyor 62 which is contained within a tubular casing 63 and carries the bone upwardly and rearwardly away from the tank discharging the bone onto a conveyor 64 which may carry the bone to some further processing operation.

The skin and meat float on the top surface of the liquid in the tank and are directed toward a paddle wheel 65 at the discharge end of the tank by means of the air jet discharged from the air nozzle 53. The paddle wheel engages the meat and skin floating on the top of the tank and discharges the same from the tank onto the second shaker 13. The second shaker 13 is generally similar to the above described first shaker 11 having a shaker tray mounted on leaf springs (not shown) and being moved back and forth by means of a vibrator 66 similar to the above described vibrator 47. This second shaker 13 also includes a foraminous plate or screen similar to the above described screen 39 which is mounted over a drain tank 67 through which the liquid drains from the skin and meat as the skin and meat pass over the second shaker 13. The liquid received by the drain tank 67, may, if desired, be returned to the first separating tank 12 by means of a return pipe 68 connected to a pump 69.

The skin and meat together are discharged into the second separating tank containing a brine solution of predetermined gravity which causes the skin to float on the surface of the liquid and the meat to sink to the bottom of the tank 14 by gravity. The skin floating on the surface of the tank is removed therefrom by means of a slat conveyor 71 which engages the skin blown towards the discharge end of the tank by means of a blower 72 and air nozzle 73 positioned immediately beneath the shaker 13. The skin thus is removed from the second separating tank, for example, by the slat conveyor 71 and discharged thereby into the container 15. It has been found in the processing of chicken that a 45% concentration of brine in the second separating tank affords the required separation of the meat from the skin.

The meat which drops by gravity to the bottom of the second separating tank 14 is collected in a sump and removed therefrom through a large diameter discharge pipe 74 which terminates above the third shaker 16. Passage of the meat through the discharge pipe 74 is effected by causing liquid to flow at a high velocity through the discharge pipe from the second separating tank 14. This flow of liquid may be created, for example, by means of a pump 75 which is connected to a venturi 76 preferably being connected to a drain tank 77. With this construction, liquid is drawn out of the drain tank 77 caused to pass through the pump and discharged at a high velocity through the venturi 76 into the discharge pipe 74. The flow of liquid through the venturi 76 creates a corresponding flow of liquid upwardly through the discharge pipe 74 carrying along the particles of meat. These meat particles are dropped on the third shaker screen 16 along with the liquid that flows through the discharge pipe 74. This liquid from the discharge pipe 74 passes through the screen, is received in the drain tank 77 and returned to the second separating tank 14 by means of a return pipe 78. With this arrangement, the same brine solution is contained in both the drain tank 77 and the second separating tank 14 with the solution constantly being circulated between these two tanks.

The third shaker 16 is generally similar in construction to the above described shakers 11 and 13 being mounted on springs (not shown) and vibrated by means of a vibrator 79, similar to the above described vibrator 47. The particles of meat pass over the shaker 16, are caused to be washed by means of a liquid spray discharged from the spray pipe 80. Preferably the liquid spray is clear water with the water from the spray being collected in a water drain tank 81. After the meat particles are washed they are discharged from the third shaker 16 onto the endless conveyor 17 which serves as a sorting table wherein workers may sort out the meat particles to separate the particles according to size and at the same time inspect the particles to make sure there are no bone fragments or skin contained with the meat particles.

As illustrated in FIG. 7, the third shaker 16 includes a frame 82 similar to the above described frame 38 which mounts upper and lower foraminous plates or screens 83 and 84, respectively. The upper plate 83 may be a perforated plate having a series of openings 85 passing therethrough while the lower plate 84 may comprise a wire mesh screen. Both the upper and lower plates 83 and 84 terminate at their forward ends in downwardly extending lip portions which extend at an acute angle to the longitudinal axis of the plates 83 and 84 with the forward end of the upper plate extending outwardly beyond the forward end of the lower plate. With this construction, all of the meat particles are initially discharged from the pipe 74 onto the upper plate 83 and are caused to pass forwardly along the upper plate 83. The smaller particles of meat drop through the openings 85 in the upper plate onto the lower plate 84 while the larger particles remain on the upper plate 83. Upon continued forward movement of the particles along the plates 83 and 84 the smaller particles are discharged onto one side edge of the conveyor 17, which extends at right angles to the longitudinal axis of the shaker 16, while the larger particles are discharged onto the opposite side edge of the conveyor 17. This greatly simplifies the sorting process since workers may be stationed along both sides of the conveyor 17 with the workers on one side sorting the fine particles and the workers on the other side sorting the larger particles.

It has been found that this apparatus is extremely effective in separating meat, skin and bones and that this apparatus will efficiently and effectively remove the skin from the meat and the meat from the bones without fracturing the relatively fragile bones and without breaking the meat up into small particles.

While a particular embodiment of the present invention has been illustrated and described herein it is not intended to limit the invention to such a disclosure and changes and modifications may be incorporated and embodied within the scope of the following claims.

We claim:

1. Apparatus for deboning precooked fowl comprising; mechanical means including resilient means operable to exert an impact force on the fowl and frictionally rub across the surface of the fowl to cause separation of the bone, skin and meat of the fowl, a first receptacle containing a liquid flotation medium of lower specific gravity than the bone and higher specific gravity than the meat and skin, a first vibrating shaker positioned intermediate said mechanical means and said first receptacle to receive the bone, skin and meat from said mechanical means and operable to disperse the same freely over the surface of the liquid flotation medium in said first receptacle, means for withdrawing the gravity segregated bone from the bottom of said first receptacle, a second receptacle containing a liquid flotation medium of lower specific gravity than the meat but higher specific gravity than the skin, conveyor means for transfering the floated meat and skin components from said first to said second receptacle, means for discharging the floated skin from the upper part of said second receptacle, and means for withdrawing the gravity segregated meat from the bottom of said second receptacle.

2. Apparatus in accordance with claim 1 wherein the conveyor means for transferring the meat and skin from said first to said second receptacle includes means for separating the skin and meat components and dispersing the same over the surface of the liquid in the second receptacle.

3. Apparatus in accordance with claim 1 wherein said first vibrating shaker includes a foraminous material receiving surface which receives the meat, skin and bones.

4. Apparatus in accordance with claim 1 wherein the conveyor means between said first and second receptacles comprises a second vibrating shaker and means to vibrate the same continuously to cause the skin and meat to be separated from one another and be transported along the second vibrating shaker in a direction toward said second receptacle.

5. Apparatus in accordance with claim 1 wherein a discharge conveyor is mounted adjacent said second receptacle and wherein hydraulic means are provided to withdraw the gravity segregated meat from the bottom of said second receptacle and deposit the same on said discharge conveyor.

6. Apparatus in accordance with claim 5 wherein a third vibrating shaker is positioned intermediate the discharge from said hydraulic means and said discharge conveyor, and wherein means are provided to continuously vibrate said third shaker to cause the meat to travel along said shaker towards said discharge conveyor.

7. Apparatus in accordance with claim 6 wherein the third vibrating shaker intermediate said hydraulic means and said discharge conveyor separates said large and small pieces of the meat from one another, and means on said vibrating shaker to deposit the small pieces of meat along one edge of the discharge conveyor and the large pieces of meat along the opposite edge of the discharge conveyor.

8. Apparatus in accordance with claim 1, including air nozzle means operatively associated with said first receptacle to discharge a current of air over the surface of the liquid flotation medium thereby to disperse skin and meat deposited thereon.

References Cited in the file of this patent
UNITED STATES PATENTS

| | | |
|---|---|---|
| 2,450,398 | Sanders | Sept. 28, 1948 |
| 2,895,162 | Harris | July 21, 1959 |
| 2,978,739 | Goldberg | Apr. 11, 1961 |
| 3,017,661 | Zartman | Jan. 23, 1962 |